Feb. 11, 1969     P. BAUER     3,426,800

BISTABLE FLUID VALVES

Filed Oct. 15, 1965

INVENTOR
PETER BAUER

BY *Hurwitz & Rose*

ATTORNEYS

United States Patent Office 3,426,800
Patented Feb. 11, 1969

3,426,800
BISTABLE FLUID VALVES
Peter Bauer, Germantown, Md., assignor to Bowles Engineering Corp., Silver Spring, Md., a corporation of Maryland
Filed Oct. 15, 1965, Ser. No. 496,307
U.S. Cl. 137—608        19 Claims
Int. Cl. F15c 3/04; F16k 11/24, 7/14

ABSTRACT OF THE DISCLOSURE

A pre-stressed leaf spring is constrained at its ends so as to be capable of assuming either of two stable configurations to and from which it may be switched upon application of pressure across its thickness. The spring includes ferromagnetic material so that it may be electromagnetically switched between its stable state, or, alternatively, so that its stable states may be sensed electromagnetically. The spring may be electrically conductive so that an electrical circuit is opened or closed in accordance with the position of the spring. In a preferred embodiment the spring is substantially S-shaped, compressed at its ends and pivoted at its center with opposite halves of the S extending through different fluid isolated chambers.

---

Figure 1:
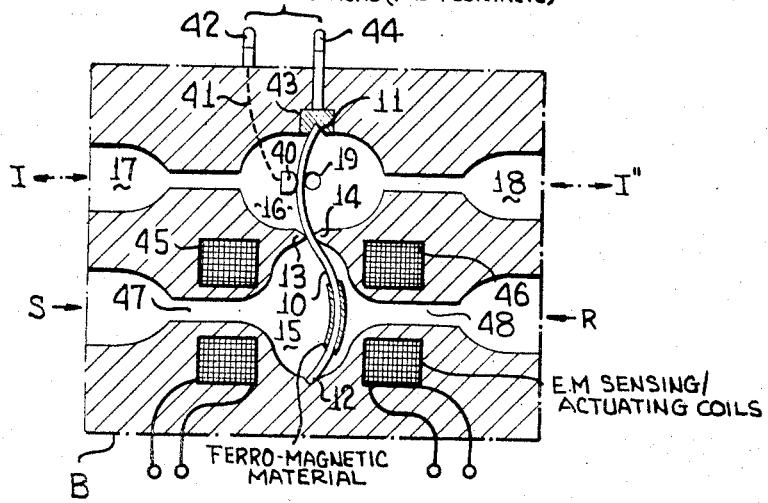

The present invention relates generally to devices having memory, and more particularly to bistable fluid valves responsive to fluid or magnetic forces to induce changes of state.

Briefly describing the invention, in one embodiment thereof a leaf spring is pre-stressed into an S shape, extending between bearing notches. The spring is pivot restrained at its center. The spring can then be deformed to provide a mirror image of the S, and thereafter can be returned to its original configuration, a normal S, and this can be accomplished by slight fluid pressure if the spring is sufficiently weak. One-half of the S may be subjected to set and reset fluid pressure selectively on opposite sides thereof, and a fluid orifice is so located that the other half of the S subsists selectively on either side of the orifice, depending on the state of the first half. The spring is inherently bistable and accordingly fluid can flow from the orifice selectively into two output passages, or vice versa from either output passage to the orifice, depending on the shape of the spring. The orifice and passages can be utilized for readout or interrogation as desired. The bistable spring and its control and output orifices then constitute a bistable logic element, analogous to a flip-flop.

In accordance with other features of the invention, the leaf spring described in the immediately preceding paragraph can actuate switch contacts, or the leaf spring, if fabricated of ferromagnetic material, can be electromagnetically deformed from and returned to a normal configuration. The leaf spring may also be utilized to control the reluctance of magnetic circuits, so that its state may be electromagnetically sensed.

Another embodiment of the invention utilizes a lead spring held at both ends, which is pre-stressed into a C shape, and which in response to a set or reset pulse of fluid can be sprung into a mirror image C shape. The spring acts as a valve, selectively covering and uncovering two ports, which are available either as readout or interrogation ports.

As in the case of the S-shaped leaf spring, the C shaped spring may be magnetically actuated and/or sensed, and if desired may open or close contacts.

It is accordingly, an object of the present invention to provide a novel fluid operated mechanical bistable valve system adapted to serve as a logic element.

It is a further object of the invention to provide a novel fluid operated valve having two stable configurations.

A further object of the invention resides in the provision of a bistable logic device including a bistable mechanical element deformable into alternative configurations and stable in either of the configurations.

It is a further object of the invention to provide a bistable fluid valve which may be actuated into either of its stable states electromagnetically, and the state of which may be sensed electrically or electromagnetically, or in terms of fluid signals.

Another object of the invention resides in the provision of a logic element capable of responding alternatively or simultaneously to fluid and electrical signals, and capable of providing fluid and/or electrical and/or electromagnetic indications of its state so that various types of logical gates may be provided, involving the application of both a fluid and an electrical signal, and providing outputs of diverse character simultaneously as logical functions of the input signals.

Figure 2:
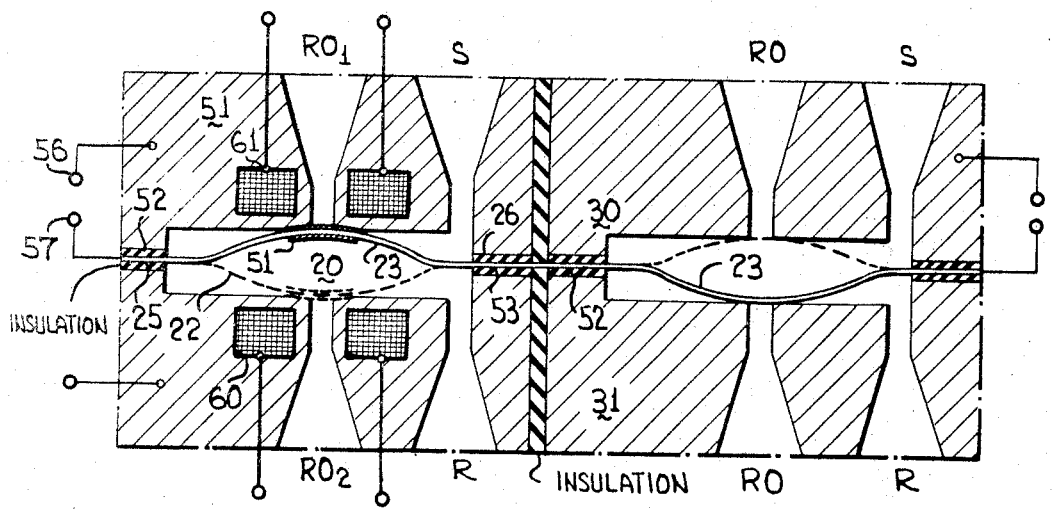

The above and still further objects, features and advantages of the present invention will become apparent upon consideration of the following detailed description of one specific embodiment thereof, especially when taken in conjunction with the accompanying drawings, wherein:

FIGURE 1 is a view in section of a fluid logic system according to the invention, wherein provision is included for electromagnetic actuation, and wherein diverse types of outputs can be achieved; and FIGURE 2 is a view in section of a logic system of FIGURE 1, wherein provision is made for electromagnetic actuation, and wherein diverse types of output are available.

Referring now to FIGURE 1 of the drawings, 10 is a leaf spring prestressed into an S shape between two bearing notches 11 and 12 which are at a smaller distance than the length of the relaxed spring. Somewhere between the bearing notches (for example at their center) the leaf is pivot restrained between two protrusions 13, 14 of a base B. Channels S and R constitute ports, which can be utilized for set and reset, and communicate with a chamber 15, within which is located one-half of the leaf spring, i.e., one arm of the S. Assuming a spring configuration as illustrated, i.e., a normal S configuration, air pressure applied to chamber 15 via the port R will stress the spring into an inverted or mirror image S configuration, and the spring having been so stressed is stable in that configuration, but may be reset to its original normal S configuration by means of fluid pressure applied via the port S. The spring is stable in either one of its configurations.

A further chamber 16 is formed between the bearing notch 11 and the bearing notches 13 and 14, within which subsists the other half of the leaf spring. Two ports 17, 18 communicate with the chamber 16 and in addition, a third port, 19, is provided in the chamber at a location such that the portion of the leaf spring subsisting in the chamber falls either to one side or the other side of that port on its alternate stable configurations. The ports 17, 18, 19 constitute readout and interrogation ports, depending on requirements. In the preferred mode, port 19 may act as an interrogation pressure signal or gating input such that port 17 provides output when memory is reset and port 18 provides output when memory is set. In the alternative, 19 and 18 may be utilized as interrogation ports and 17 as a readout port, the latter providing a 1 or 0 output depending on which interrogation port is supplied with a pressure signal, and further depending on the configuration of the spring 10 at the time.

If all of three channels 17, 18, 19 are of low impedance, leaks due to necessary leaf clearances and tolerances become unimportant. Similar argument pertains to the part of the spring which responds to the R and S, i.e., reset and set, ports.

Since the leaf has two stable configurations, it can act as a memory. The leaf may be as small as 0.1 inch in length or less and may be made from a spring material of a few thousandths of an inch thickness, in order that low fluid pressures may be able to actuate the system.

While only a single logic element has been illustrated and described, it will be clear that the construction permits memory matrices in a single layer of material, of for example 64 per square inch, assuming that ⅛ by ⅛ inch is required for the area of a single logic element. And by stacking layers of logic elements, calculation shows that a quarter of a million bits can be achieved per cubic foot of volume.

In FIGURE 2 a chamber 20 is provided which may be divided in two halves 21 and 22 by a preformed leaf spring 23. The leaf spring may be so configured as to divide the chamber 20 into substantially isolated halves and by suitable configuration of the spring the chamber may be cylindrical or square as desired. Set and reset ports S and R are provided adjacent to the one end of the chamber and readout ports $RO_1$ and $RO_2$ may be provided adjacent the center of the chamber. The spring is held firmly at the ends 25, 26 of the chamber and is of such length that it must assume a C shape. The high point of the C is so located as to close either of the port $RO_1$ or $RO_2$ depending on the sense of the flexing of the spring 23. Flexing of the spring is accomplished by providing fluid pressure at the ports R or S, selectively, that pressure being applied over a large area of the spring, i.e., approximately one-half thereof, so that a fairly small pressure applied to either of the ports R, S provides a fairly large total pressure on the spring in grams. The ports $RO_1$ and $RO_2$ are then used for interrogation and readout and the ports R and S are used for set and reset of the bistable unit.

In the alternative, the ports $RO_1$ and $RO_2$ may be used for set and reset and the ports S and R for interrogation and readout. However, this has the disadvantage that the maximum force in pounds must be applied to the spring at the time when the spring is in one of its extreme positions. At this time the total area of the spring exposed to a port is very small so that relatively high fluid pressure must be applied to attain a high total pressure in pounds applied to flex the springs.

A large number of logic elements of the type illustrated in FIGURE 2 of the drawings can be most readily achieved in a unitary construction by employing end to end cylinders and a continuous length of spring stock having dimples located within the cylinders, the continuous length of spring stock being held between two sheets of material as 30, 31 at the spaces between cylinders.

It is feasible in the system of FIGURE 2 to use a relatively high level set and reset pulse, but a very small low level interrogation pulse may be utilized. In such case the logic element of FIGURE 2 inherently distinguishes between set and reset pulses, since very weak set and reset pulses, corresponding with interrogation pulses, cannot transfer the state of the system. This capability is required since an interrogation pulse may be applied to RO, while closed, and in such case it is desired that no fluid flow.

In the system of FIGURE 1 may be provided an electrical contact 40, connected to lead 41 to a terminal 42. The base B may be made of insulating material, but the lead spring 10 of ferromagnetic material. The notch 11 may include conducting material 43 and connected with a terminal 44. The structure described then provides a closed circuit from terminals 42, 44 in one stable state of spring 10 and an open circuit in the alternative state, so that the state of the leaf spring may be electrically sensed.

Two coils 45 and 46 may surround the passages 47, 48 extending from orifices S and R into chamber 15. The leaf spring 10 may then be electromagnetically actuated into its alternate states by selectively energizing the coils 45, 46. Since the leaf spring 10 occupies positions more nearly adjacent one or the other of coils 45, 46, according to its state, that state may be sensed in terms of coil impedance, which will be lower when the coil is remote than when it is adjacent.

Similarly, in the system of FIGURE 2, the body containing the various passages may be divided into conductive halves 50, 51, separated by insulation 52 and the spring 23 may be fabricated of ferromagnetic material or may be conductive and carry a ferromagnetic armature 51.

Ends of spring 23 may be brought out from the insulation 52 so that the spring 23 is electrically isolated from one body half 50 in one of its states but in contact with the other body half 51 in that state (illustrated) while the spring 23 closes the $RO_1$ passage. Terminals 55, 56, 57 are provided for the body halves 50, 51 and for the spring 23, respectively, so that the state of the spring can be sensed electrically.

Additionally, electromagnets 60, 61 may be provided, which are capable of changing the state of the spring 23 when energized, and of sensing the state of the spring in terms of coil impedance, as in the system of FIGURE 1.

The system of the invention possesses unique properties as a logic element, in that electromagnetic input signals may be arranged to be capable of outbalancing fluid input signals. Thereby an electrical "set" signal applied concurrently with a "reset" fluid signal provides no response, as does an electrical "reset" signal and a "set" fluid signal. The system then performs the function of a NOR gate.

Alternatively, the springs may be sufficiently stiff and the signals sufficiently weak that only concurrent electrical and fluid signals can cause a change of state, thus performing an AND function.

The electrical circuitry and electromagnetics may be dispensed with if a pure fluid system is desired.

The state of the system may be "set" and "reset" electromagnetically, and read out in terms of fluid signals alone, or in terms of electrical signal or both. In the alternative, "set" and "reset" may be electrical and readout wholly fluid.

While I have described and illustrated one specific embodiment of my invention, it will be clear that variations of the details of construction which are specifically illustrated and described may be resorted to without departing from the true spirit and scope of the invention as defined in the appended claims.

I claim:
1. A fluid logic device, comprising
a valving element capable of being translated into two alternative stable configurations,
a source of fluid pressure,
set and reset means responsive to said fluid pressure for translating said valving element selectively into either of said alternative stable configurations,
an interrogation port,
a readout port,
means selectively providing and blocking a path between said interrogation port and said readout port according to the one of the alternative stable configurations into which said valving element is translated,
said valving element comprising a flexible element capable of being selectively flexed into said alternative states, each of said alternative states being a condition of flexure of said flexible element, wherein said flexible element is flexed alternatively into a normal S and a mirror image S configuration.

2. A fluid amplifier, including
a first chamber,
a second chamber,
an elongated resilient member extending through at least one of said chambers and into the other of said chambers, said member being capable of being flexed into two alternative stable configurations in each of said chambers, said chambers being substantially fluid isolated from each other,
means for applying fluid pressure differentially across the thickness of said elongated resilient member in said first chamber sufficient to flex said member into either of said stable configurations in both of said chambers in dependence upon the polarity of the differential pressure,
at least one fluid outlet port in said second chamber for issuing a stream of fluid into said second chamber, said portion of said elongated resilient member being located in valving relation to said stream of fluid.

3. The combination according to claim 2 wherein is further provided a wall separating said first and second chambers, said wall having an opening extending therethrough to receive said resilient member, said opening being substantially the same size and shape as the cross-section of said resilient member so that there is substantially no fluid flow between said chambers.

4. The combination according to claim 3 wherein said resilient member is under constraint at its opposite edge positions, said stable configurations comprising S and inverse S configurations respectively wherein opposite halves of the S are located in respective ones of said first and second chambers.

5. The combination according to claim 3 wherein the center of the S-configured resilient member is located at said opening, and wherein said resilient member extends completely through both said chambers and is supported at its opposite ends in the walls of said chambers.

6. The combination according to claim 2 wherein said portion of said elongated resilient member extending into said second chamber extends completely thereacross and forms two sub-chambers therein, said port being located at a boundary of said sub-chambers.

7. The combination according to claim 6 wherein said resilient member is under constraint at its opposite edge portions, said stable configurations comprising S and inverse S configurations respectively wherein opposite halves of the S are located in respective ones of said first and second chambers.

8. A fluid device, comprising
a chamber,
a fluid valving element capable of being translated into stable alternate states, said valving element being deformable into distinct configurations representative of said alternate states, said valving element being disposed within said chamber so as to define two substantially fluid isolated sub-chambers therein,
fluid pressure means for translating said fluid valving element selectively into said alternate stable states,
and electromagnetic means for translating said fluid valving element selectively into said alternate stable states,
wherein said fluid pressure means and said electromagnetic means are individually operable.

9. The combination according to claim 8 further comprising electrical means for sensing the state of said fluid valving element.

10. The combination according to claim 8 wherein said fluid valving element is arranged to assume one of its stable states only in response to conjoint action of said fluid pressure means and electromagnetic means.

11. The combination according to claim 8 wherein said fluid valving element is flexible alternately into a normal C and a mirror image C configuration.

12. The combination according to claim 8 wherein said fluid valving element is flexible alternately into a normal S and mirror image S configuration.

13. The combination according to claim 8 wherein said fluid pressure means includes set and reset ports communicating with different ones of said sub-chambers, and means for selectively applying fluid pressure to said set and reset ports for translating said valving element into either of said alternate stable configurations.

14. The combination according to claim 13 further comprising:
an interrogation port,
a readout port,
means for selectively providing and blocking a path between said interrogation port and said readout port according to the one of the alternate stable configurations into which said valving element is translated.

15. The combination according to claim 13 wherein at least one of said set and reset ports constitutes the readout port.

16. The combination according to claim 13 wherein at least one of said set and reset ports constitutes an interrogation port.

17. The combination according to claim 8 wherein said electromagnetic means and said fluid pressure means are selectively operable to sense the state of said fluid valving element.

18. The combination according to claim 17 further comprising electrical means for sensing the state of said fluid valving element.

19. A fluid device comprising:
means for providing a chamber including a wall in part defining said chamber;
a valve, including an elastic member under constraint at opposite edge portions, disposed in said chamber and having a first position in which it is flexed to contact said wall and having a second position in which it is displaced from said wall;
fluid pressure means for translating said valve selectively into said first and second positions; and
electromagnetic means for translating said valve selectively into said first and second positions.

References Cited

UNITED STATES PATENTS

| | | | |
|---|---|---|---|
| 3,071,154 | 1/1963 | Cargill et al. | 137—81.5 |
| 3,099,995 | 8/1963 | Raufenbarth | 235—200 XR |
| 3,168,898 | 2/1965 | Samet | 137—81.5 |
| 3,171,915 | 3/1965 | Johnson | 137—81.5 XR |
| 3,187,762 | 6/1965 | Norwood | 137—81.5 |
| 3,252,481 | 5/1966 | Meier | 137—81.5 XR |
| 3,258,685 | 6/1966 | Horton | 137—81.5 XR |
| 3,266,514 | 8/1966 | Brooks | 137—81.5 |
| 3,273,594 | 9/1966 | Mayer | 137—81.5 XR |

OTHER REFERENCES

"Fluid Logic and Circuit," I.B.M. Technical Disclosure Bulletin, J. H. Meier, vol. 6; No. 3, August, 1963, pp. 28, 29 (Copy in group 360 and Scientific Lib.).

"Fluid-Actuated Latch," I.B.M. Technical Disclosure Bulletin, F. R. Humphrey, et al., vol. 8; No. 3, August, 1965 (Copy in group 360 and Scientific Lib.).

SAMUEL SCOTT, *Primary Examiner.*

U.S. Cl. X.R.

137—815; 235—201